United States Patent
Brice

(10) Patent No.: US 9,217,292 B2
(45) Date of Patent: Dec. 22, 2015

(54) TWO-PORT PERCUSSION MOLE

(75) Inventor: Mark Brice, Faversham (GB)

(73) Assignee: Geo-Mole Limited (GB)

( * ) Notice: Subject to any disclaimer, the term of this patent is extended or adjusted under 35 U.S.C. 154(b) by 522 days.

(21) Appl. No.: 13/809,303

(22) PCT Filed: Jul. 14, 2011

(86) PCT No.: PCT/GB2011/051318
§ 371 (c)(1),
(2), (4) Date: May 8, 2013

(87) PCT Pub. No.: WO2012/007756
PCT Pub. Date: Jan. 19, 2012

(65) Prior Publication Data
US 2015/0060139 A1   Mar. 5, 2015

(30) Foreign Application Priority Data
Jul. 16, 2010   (GB) .................................. 1011999.8

(51) Int. Cl.
*E21B 7/26* (2006.01)
*E21B 7/20* (2006.01)
*E21B 4/14* (2006.01)
(Continued)

(52) U.S. Cl.
CPC . *E21B 7/206* (2013.01); *E21B 1/00* (2013.01); *E21B 4/14* (2013.01); *E21B 4/145* (2013.01); *E21B 7/20* (2013.01); *E21B 7/26* (2013.01); *E21B 17/00* (2013.01); *E21B 21/10* (2013.01);
(Continued)

(58) Field of Classification Search
CPC ............. E21B 7/26; E21B 7/206; E21B 1/00; E21B 4/145; E21B 4/14; E21B 10/14; E21B 36/00; F24J 3/08
See application file for complete search history.

(56) References Cited

U.S. PATENT DOCUMENTS

| 5,109,932 A | 5/1992 | Bueter et al. |
| 5,161,626 A | 11/1992 | Laffkas |
| 8,936,113 B2 * | 1/2015 | Brice et al. .................... 175/296 |

FOREIGN PATENT DOCUMENTS

| CN | 1397715 | 2/2003 |
| EP | 1006322 A2 | 6/2000 |

(Continued)

OTHER PUBLICATIONS

Machine Translation of EP 1006322.
Machine Translation of EP 2123994.
Search Report in GB 1011999.8, dated Sep. 20, 2010.
International Search Report and Written Opinion in PCT/GB2011/051318, dated Sep. 28, 2012.

*Primary Examiner* — Kenneth L Thompson
*Assistant Examiner* — Steven MacDonald
(74) *Attorney, Agent, or Firm* — Barnes & Thornburg LLP

(57) ABSTRACT

A percussion mole for inserting a ground-loop for a geothermal heat-pump apparatus. The ground-loop includes a first pipe and a second pipe. The mole comprises: a percussive drive mechanism; a first passage connectable to the first pipe, for receiving a driving fluid via the first pipe and delivering it to the drive mechanism, during insertion of the ground-loop; a second passage connectable to the second pipe, for exhausting the driving fluid from the drive mechanism via the second pipe, during insertion of the ground-loop; and a connection connecting the first passage with the second passage. The connection includes a non-return valve arranged to restrict flow of the driving fluid from the first passage to the second passage during insertion of the ground-loop but permit flow in the opposite direction, whereby after insertion, when the heat pump apparatus is in use, the ground-loop comprises the first and second pipes; the first and second passages; and the connection.

15 Claims, 5 Drawing Sheets

(51) Int. Cl.
  *F24J 3/08* (2006.01)
  *E21B 1/00* (2006.01)
  *E21B 17/00* (2006.01)
  *E21B 21/10* (2006.01)

(52) U.S. Cl.
  CPC ............ *F24J 3/081* (2013.01); *F24J 2003/088* (2013.01); *Y02B 30/52* (2013.01); *Y02E 10/12* (2013.01)

(56) References Cited

FOREIGN PATENT DOCUMENTS

| | | |
|---|---|---|
| EP | 2123994 A1 | 11/2009 |
| GB | 2468496 A | 9/2010 |
| WO | WO-2006/089400 A1 | 8/2006 |

\* cited by examiner

TWO-PORT PERCUSSION MOLE

This invention relates to a method and apparatus for laying underground pipe work. It is particularly relevant in the case that the pipes form a part of a heating or cooling system using a heat pump—that is, a geothermal, or ground-source, heat-pump system.

Heat-pump based heating systems are becoming more popular as a means of heating. They work by extracting heat energy from the ground, concentrating it and redirecting it—for example, to heat a building or other space. It is also possible to configure the system to act in reverse, whereby heat is extracted from a building and conducted to the ground (that is, as a cooling system for the building). In either configuration, heat energy is transferred between the ground and the pump system via a thermally-conductive loop of pipe laid in the ground. The pipe contains a fluid, which is circulated by a pump to transfer heat energy around the system. In a typical closed-loop system, the fluid is a solution of water and antifreeze.

The thermally-conductive pipe work may be laid in the ground in a variety of arrangements depending on factors including site-access, soil-type, proximity of buildings, or site boundaries. The pipes may be installed such that they are substantially horizontal, in which case they may be laid in open trenches that are subsequently filled in. Alternatively, the pipes may be placed in holes in the ground produced by conventional percussion-moling or drilling techniques. In this case, access to the distant end of the hole can be achieved, for example, by means of a pit into which the hole emerges. It is often desirable—for example, to keep within a restrictive site boundary—to place the pipes in holes which are not horizontal and instead project downwards at an angle (in some cases vertically downwards). These holes may be very deep, exceeding 100 meters or more, and are typically produced by drilling techniques involving expensive and cumbersome equipment, which must be located at the point of entry at ground-level. Clearly, in this case, access to the other end of the hole is impossible; therefore, after the hole has been prepared, a pair of pipes joined at their end by a compact 180 degree coupling is inserted in the hole, such that in the completed heating system, fluid may be circulated down into the hole and back again.

Methods currently employed to create holes where there is no far-end access require the use of expensive and cumbersome drilling and boring machines. Often, the expense is prohibitive or access for drilling machinery is impossible. By way of example: condensed urban locations may have little or no access to the exposed ground around a site to be heated or may have no external ground at all, such that the only practical solution is to enter the ground from within the building itself (for example, through a cellar floor). Percussion moles (also known as impact moles or soil-displacement hammers) are pneumatically driven devices that can be used in instances where it is required to lay a pipe or cable underground, without first digging a trench. Most commonly used to pass horizontally beneath a roadway or similar obstruction, the percussion mole is usually placed in the side of a pit and aimed at a distant pit of similar depth where it is intended to emerge. The mole is driven by compressed air, provided along a rear-mounted compressed air hose. An internal piston having significant mass is caused to travel rapidly forwards within the tubular casing of the mole, where it strikes the forward end of the casing, driving the casing forwards, displacing the ground around the casing in the process. Internal valves are arranged so that, having struck the forward position within the casing, the piston is driven back to the rear of the casing with less energy, at which point its travel is arrested. The exhaust air is then vented into the cavity behind the mole and the cycle is repeated. Energy dissipated during rearward travel of the internal piston and its subsequent reversal is insufficient to overcome the friction between the casing and the ground compressed around it; therefore, the casing does not travel backwards during this part of the cycle.

U.S. Pat. No. 5,161,626 has described the use of a mole for sinking geothermal wells. The mole has three ports and accordingly pulls three pipes behind it into the ground.

According to a first aspect of the invention, there is provided a percussion mole for inserting a ground-loop for a geothermal heat-pump apparatus, the ground-loop including a first pipe and a second pipe, the mole comprising: a percussive drive mechanism; a first passage connectable to the first pipe, for receiving a driving fluid via the first pipe and delivering it to the drive mechanism, during insertion of the ground-loop; a second passage connectable to the second pipe, for exhausting the driving fluid from the drive mechanism via the second pipe, during insertion of the ground-loop; and a connection connecting the first passage with the second passage, the connection including a non-return valve arranged to restrict flow of the driving fluid from the first passage to the second passage during insertion of the ground-loop but permit flow in the opposite direction, whereby after insertion, when the heat pump apparatus is in use, the ground-loop comprises the first and second pipes; the first and second passages; and the connection.

With this arrangement, when the heat-pump system is in use, the valve can permit flow of a heat-exchange fluid from the second passage to the first passage. This allows the same two pipes to be used to drive the mole, during insertion, and comprise the ground-loop during use of the heat-pump apparatus. The non-return valve offers a simple but effective way of supporting the two roles of the mole. It may allow the ground-loop to be connected to the heat-pump system without any additional modifications after insertion is complete. This is possible, for example, if the heat-exchange fluid is circulated in the opposite direction to the driving fluid. In this case, the heat-exchange fluid itself automatically causes the only configuration change necessary—namely, the opening of the non-return valve.

A non-return valve—also known as a check valve or one-way valve—is designed to allow fluid flow in one direction, but substantially prevent fluid flow in the opposite direction.

The mole preferably has: a first configuration in which each of the first and second passages is in fluid communication with the percussive drive mechanism; and a second configuration in which at least one of the first and second passages is isolated from the drive mechanism.

If the drive mechanism is isolated at one passage after insertion is complete, the drive mechanism may fill with heat-exchange fluid, when the heat-pump system is in use, but there will be no through-flow of fluid.

Preferably, both of the first and second passages are isolated from the drive mechanism in the second configuration.

If the drive mechanism is isolated at both passages, no heat-exchange fluid should enter the drive mechanism at all. That is, the forward, driving parts of the mole will be completely isolated from the heat-exchange fluid circulating in the ground loop.

The mole may be adapted to switch from the first configuration to the second configuration in response to the receipt of a body injected into at least one of the first passage and the second passage.

This is one advantageous way to effect the isolation. The injected body can block and seal the path to the drive mechanism. The body may be a ball or plug made of rubber or plastic.

At least one of the first passage and the second passage may comprise a constriction adapted to receive the body, thereby isolating that passage from the drive mechanism.

The non-return valve may comprise a flap mounted in the connection on a pivot offset from the centre of the connection, the flap being rotatable about the pivot to block the connection in response to positive fluid pressure at the first passage and rotatable to unblock the connection in response to positive fluid pressure at the second passage.

This type of non-return valve is sometimes referred to as a swing check valve or tilting disc check valve. The pivot may comprise one or more trunnions. The pivot is offset from the centre of the connecting passage in a plane perpendicular to the direction of flow, so that the pressure of the fluid exerts unequal forces on the parts of the flap on either side of the pivot. The flap is therefore asymmetric about the pivot. To accommodate this asymmetric flap, the pivot may be located closer to one of the first and second passages than the other—that is, closer to one side of the connection. This may allow the larger side of the flap to be accommodated when the valve is open.

The non-return valve preferably has a first configuration in which it prevents fluid-flow from the first passage to the second passage; and a second configuration in which it allows fluid-flow from the second passage to the first passage.

The first configuration is selected by the application of a positive pressure at the first passage (relative to the second). The second configuration is selected by the application of a positive pressure at the second passage (relative to the first).

The non-return valve may initially be provided in the first configuration and may be adapted to lock in the second configuration In some embodiments, the non-return valve may lock in its open configuration. For example, the valve may be held or biased in its open configuration by latching means. This may mean that, once opened, the valve can permit flow in either direction without closing again. In other words, the switching of the valve from the first (closed) configuration to the second (open) configuration would be irreversible in normal use.

Also provided is a kit of parts, comprising: a mole as described above; and at least one body for injection into at least one of the first passage and the second passage of the mole.

According to another aspect of the invention there is provided a method of inserting and using a ground-loop for a geothermal heat-pump system, the ground-loop including a first pipe and a second pipe, using a percussion mole as described above, the method comprising: supplying driving fluid to the first passage of the mole via the first pipe so as to drive the mole into the ground; and after the mole has been driven a desired distance, supplying heat-exchange fluid to the second passage via the second pipe, whereby the heat-exchange fluid flows in through the second pipe; into the second passage; through the connection; out of the first passage; and out through the first pipe.

According to a further aspect of the invention there is provided a method of inserting and using a ground-loop for a geothermal heat-pump system, the ground-loop including a first pipe and a second pipe, using a percussion mole as discussed above, the method comprising: supplying driving fluid to the first passage of the mole via the first pipe so as to drive the mole into the ground; after the mole has been driven a desired distance, switching the non-return valve irreversibly to the second configuration by supplying a fluid to the second passage via the second pipe; followed by circulating heat-exchange fluid through the first pipe; first passage; connection; second passage; and second pipe, in either direction.

According to yet another aspect of the invention there is provided a method of inserting a ground-loop for a geothermal heat-pump system, the ground-loop including a first pipe and a second pipe, using a percussion mole as described above, the method comprising: supplying driving fluid to the first passage of the mole via the first pipe so as to drive the mole into the ground; and after the mole has been driven a desired distance, injecting a body into at least one of the first passage and the second passage, to switch the mole to the second configuration.

The step of switching the mole to the second configuration may comprise: injecting a first body into the first passage under the force of driving fluid; followed by, injecting a second body into the second passage under the force of driving fluid.

It may be beneficial to isolate the first passage first. When the first body is injected and blocks the path to the driving mechanism of the mole, the positive pressure of the driving fluid tends to keep the non-return valve closed and forces the body forwards to form a tighter seal. The second body is then injected into the second passage. The positive pressure at the second passage drives the second body to block the path and at the same time tends to open the non-return valve. Once the second body is in place, the drive mechanism of the mole is completely isolated. If the non-return valve has not yet opened, the pressure of driving fluid will build up until sufficient to open the valve.

The valve may therefore be designed to open only in response to a relatively high pressure at the second passage. The valve may also be designed so that, once opened by the high pressure of the driving fluid, the relatively lower pressure of the heat-exchange fluid arriving at the second passage is sufficient to keep it open.

Alternatively or in addition, the valve may be designed to latch open. In this sense, it may be seen as a single-use non-return valve, because once opened, it may allow fluid flow in either direction.

According to another aspect of the invention, there is provided a percussion mole comprising: a head and a body, wherein the head includes a portion that is wider than the body. That is, the head is wider than the body when viewed in at least one longitudinal cross-section.

Such a mole may be particularly well adapted to moling vertically downwards or downward into the ground at an angle, since in these circumstances it may be desirable to reduce friction on the body of the mole. On the contrary, when moling horizontally, it would ordinarily be desirable to maintain a certain minimum level of friction, since the frictional force prevents the mole from moving backwards, when the piston is returning to its starting position. When moling downward, gravity can instead fulfil this role.

According to another aspect of the invention, there is provided a percussion mole comprising: a percussive drive mechanism and a casing around the drive mechanism, wherein the drive mechanism comprises: a piston slidable within the casing and having a chamber; and a stem for communicating driving fluid to the chamber, so as to drive the piston, the stem preferably being formed wholly or partially of a plastics material.

The inherently greater flexibility of the plastics material, compared with the equivalent metal part, means that the manufacturing tolerances on the moving and static parts can be increased without the percussive drive mechanism sticking when in use. This may allow greater efficiency—for example, greater distance travelled for a given volume and pressure of driving fluid supplied.

The chamber of the piston may comprise an aperture at or near a lower end thereof, for allowing drainage of any liquid that may accumulate in the piston chamber to the inside of the casing.

The casing around the drive mechanism may comprise a passage for allowing drainage of liquid from a position at or near the bottom end of the inside of the casing, when the mole is in use. The passage preferably comprises a one-way valve, for allowing drainage of the liquid out of the mole while restricting in-flow of liquid from outside the mole.

Different aspects of the invention may be combined, for greater advantage.

The invention will now be described by way of example, with reference to the accompanying drawings, in which.

Figure 1:
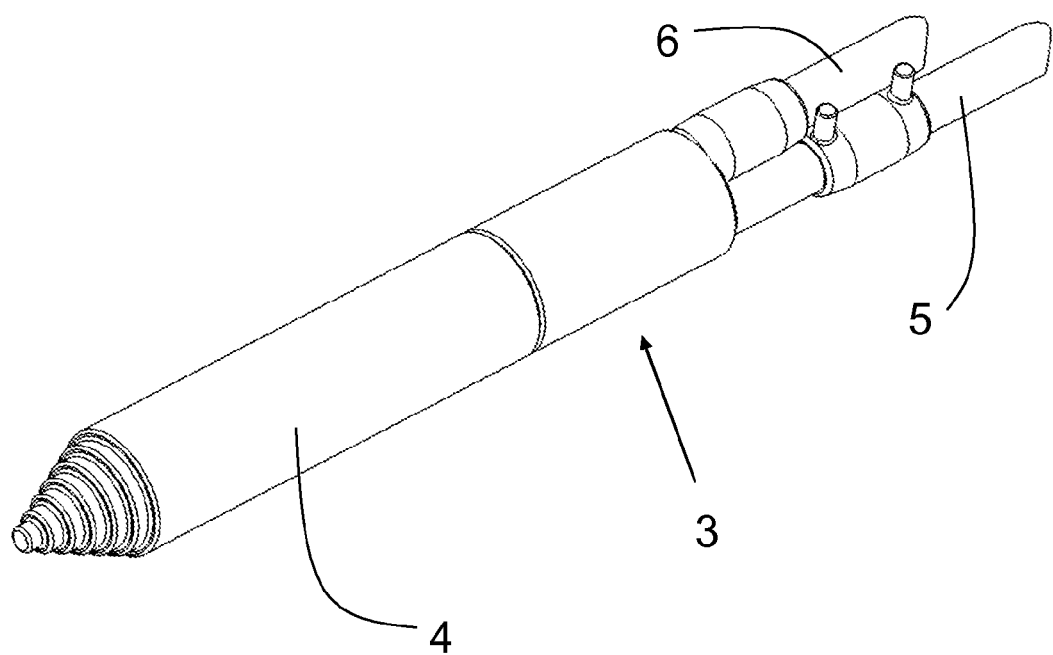
FIG. 1 shows a perspective view of a percussion moling machine, according to an embodiment of the invention.

It should be noted that these figures are diagrammatic and not necessarily drawn to scale. Relative dimensions and proportions of parts of these figures have been shown exaggerated or reduced in size, for the sake of clarity and convenience in the drawings.

The following example focuses on exemplary embodiments of the invention, in which the moling apparatus is pneumatic. That is, the driving fluid for the mole is compressed air.

The moling apparatus 3 of a first exemplary embodiment is shown in FIG. 1. A mole 4 is fitted with two rear-projecting pipes, 5 and 6, which are of the type commonly used for heat pump systems. The pipes are used initially as a route for providing compressed air to the mole 4 and a route back to the surface for exhaust air from the mole 4. At a desired depth of penetration into the ground, the compressed air supply is disconnected and the pipes are connected to the rest of the geothermal heat pump system. In use, the heat-exchange fluid will then circulate through the ground loop, which comprises the first 5 and second 6 pipes and part of the mole 4.

Figure 2:
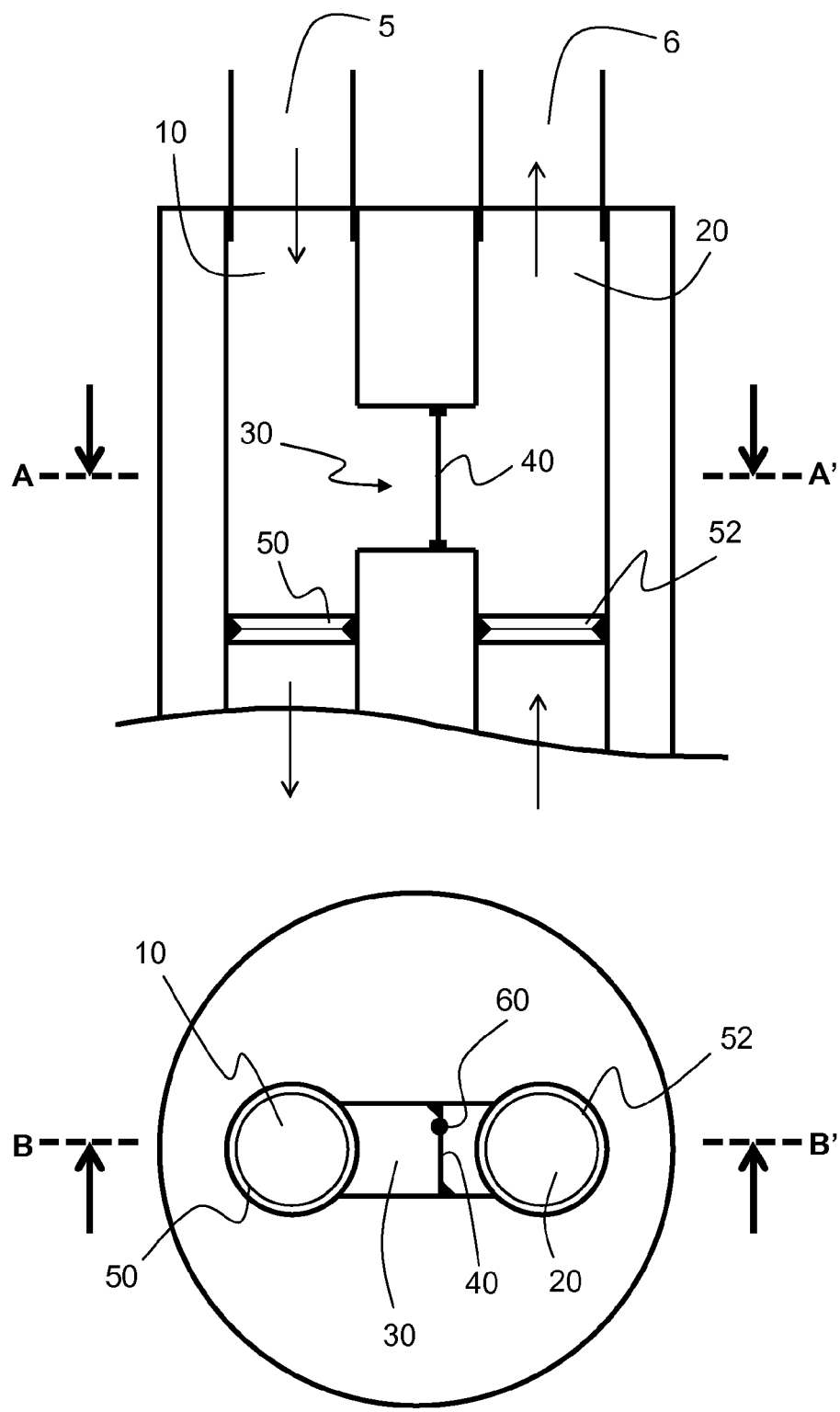
FIG. 2 shows schematic cross-sections in plan and elevation for the rear part of the moling machine of FIG. 1, with the non-return valve in a first, closed configuration.

FIG. 2 shows the rear end of the mole 4 in cross section. The upper drawing shows an elevation, taken along the line B-B' in the lower drawing. The lower drawing shows a corresponding plan, taken along the line A-A' in the upper drawing.

The first pipe 5 is coupled to a first port or passage 10 in the rear of the mole. This passage comprises the air intake for the drive mechanism of the mole (not shown). Compressed air is supplied via the first pipe 5 to the first passage 10 to drive the mole into the ground. Exhaust gas from the mole exits via a second port or passage 20 and returns to the surface via the second pipe 6, which is coupled to this port. In this embodiment, the pipes are plastic and the couplings are of the commonly used thermal fuse type. The flow of air in the first passage 10 and second passage 20 is indicated by arrows.

There is a connection or opening 30 between the first passage 10 and second passage 20, which contains a non-return (one-way) valve 40. The valve is arranged to prevent fluid flow in the direction from the first passage 10 to the second passage 20. Therefore, when compressed air is supplied to the first passage 10 to drive the mole, the one-way valve remains closed, forcing the air to flow into the drive mechanism to drive the mole 4.

In this embodiment the connection comprises a connecting conduit 30 between the first 10 and second 20 passages. The non-return valve comprises a flap 40 mounted in the conduit 30 on a pivot 60 offset from the centre of the conduit. The flap will rotate about the pivot to close the connection 30 in response to positive (relative) fluid pressure at the first passage 10. It will rotate to open the connection in response to positive (relative) fluid pressure at the second passage 20.

In this embodiment, the mole has a first configuration for driving/insertion, in which each of the first and second passages is in fluid communication with the percussive drive mechanism. It has a second, different configuration for use as part of the ground-loop, in which the first and second passages are isolated from the drive mechanism.

Figure 3:
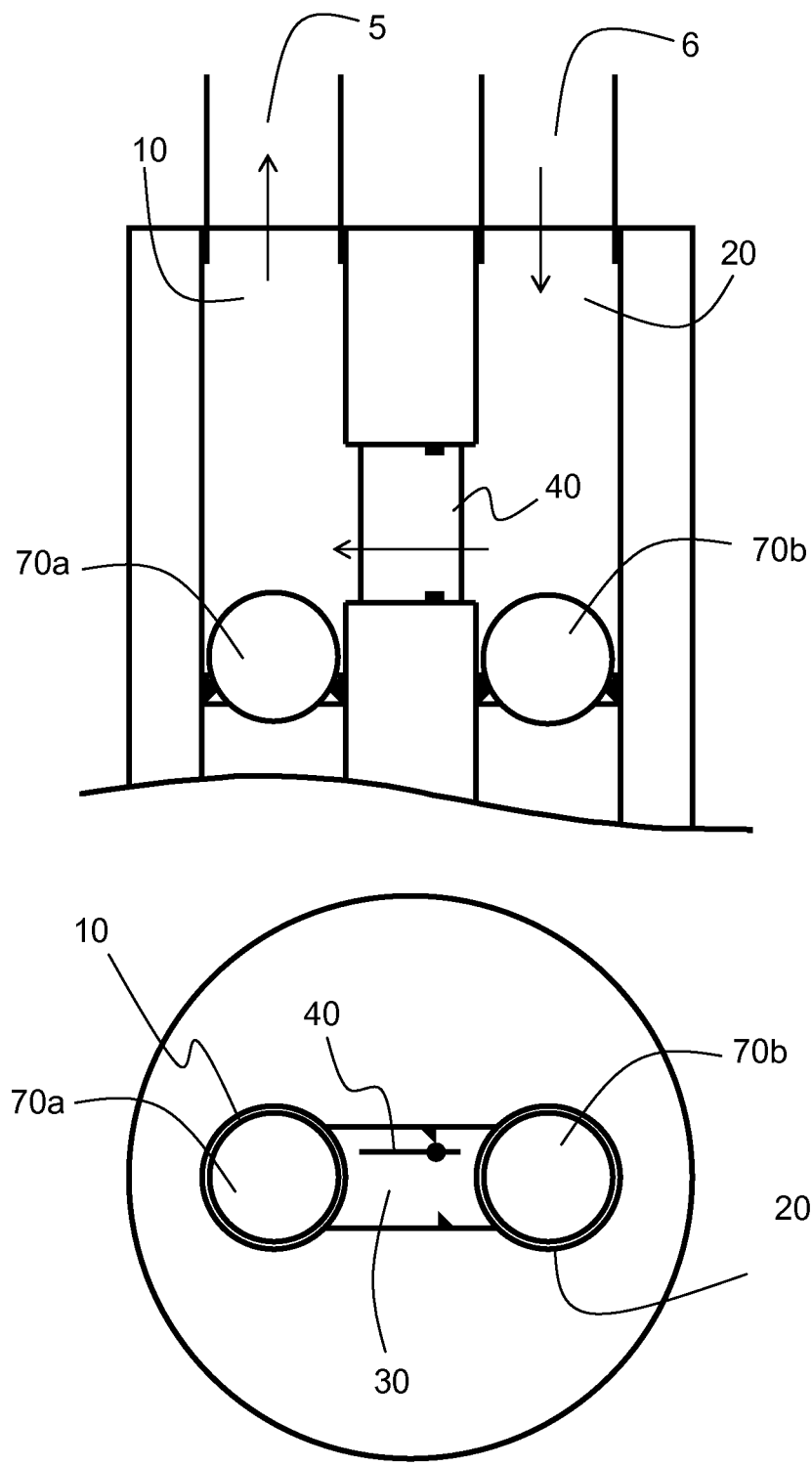
FIG. 3 shows schematic cross-sections corresponding to those of FIG. 2, when the non-return valve is in a second, open configuration.

The change to the second configuration is achieved by injecting a rubber ball 70a, 70b into each passage under force of compressed air. The balls could be injected in either order; however, in the present example, a ball 70a is injected into the first passage 10 first, followed by injecting a ball 70b into the second passage 20. FIG. 3 shows the mole 4 in the second configuration.

The first passage 10 has a constriction 50, at a point beyond the connecting conduit 30, which is adapted to receive the ball 70a and thereby isolate the passage from the drive mechanism below. The second passage has a similar constriction 52. In this example each constriction is provided by an O-ring in the wall of the passage.

When the balls 70a, 70b are injected, they travel down the respective pipe 5, 6 and into the respective passage 10, 20, until they reach the constriction, where they can travel no further and become stuck. If the first ball 70a is injected first, there is a potential added benefit in that the one-way valve 40 remains closed. Therefore, once the ball 70a is seated in the constriction 50 there is no escape route for the compressed air. This can enable a build up of pressure behind the ball, tending to further force it into its seat and secure it there. The ball preferably forms an interference fit with the wall of the bore and/or the constriction 50.

When the second ball 70a is injected, it too travels down until it is trapped against the constriction 52. The pressure of the compressed air opens the one-way valve 40, as illustrated in FIG. 3, where the flap 40 no longer blocks the connection 30.

The ground-loop is now ready for use. The ends of the pipes 5, 6 at the surface are connected to the heat-pump system, which will circulate heat-exchange fluid through them in a conventional manner. In this embodiment, the non-return valve 40 has a simple construction and the heat exchange fluid should be supplied via the second pipe 6 to the second passage 20. This ensures that the valve remains open, since it is arranged to permit flow in via the second passage 20 and out via the first passage 10. In other words, the flow direction of the heat-exchange fluid in the pipes 5, 6 and passages 10, 20 is opposite to the flow of compressed air when the mole is being driven. If heat-exchange fluid were supplied to the first passage, the non-return valve 40 would close again.

In this embodiment, the seal formed by the balls 70a, 70b serves to isolate the forward parts of the mole, which include the drive mechanism. The heat exchange fluid therefore does not flow into or through the drive mechanism when the ground-loop is in use. This means that the volume of heat exchange fluid in the system can be minimised and heat transfer to or from the surrounding ground can be maximised.

Figure 4:
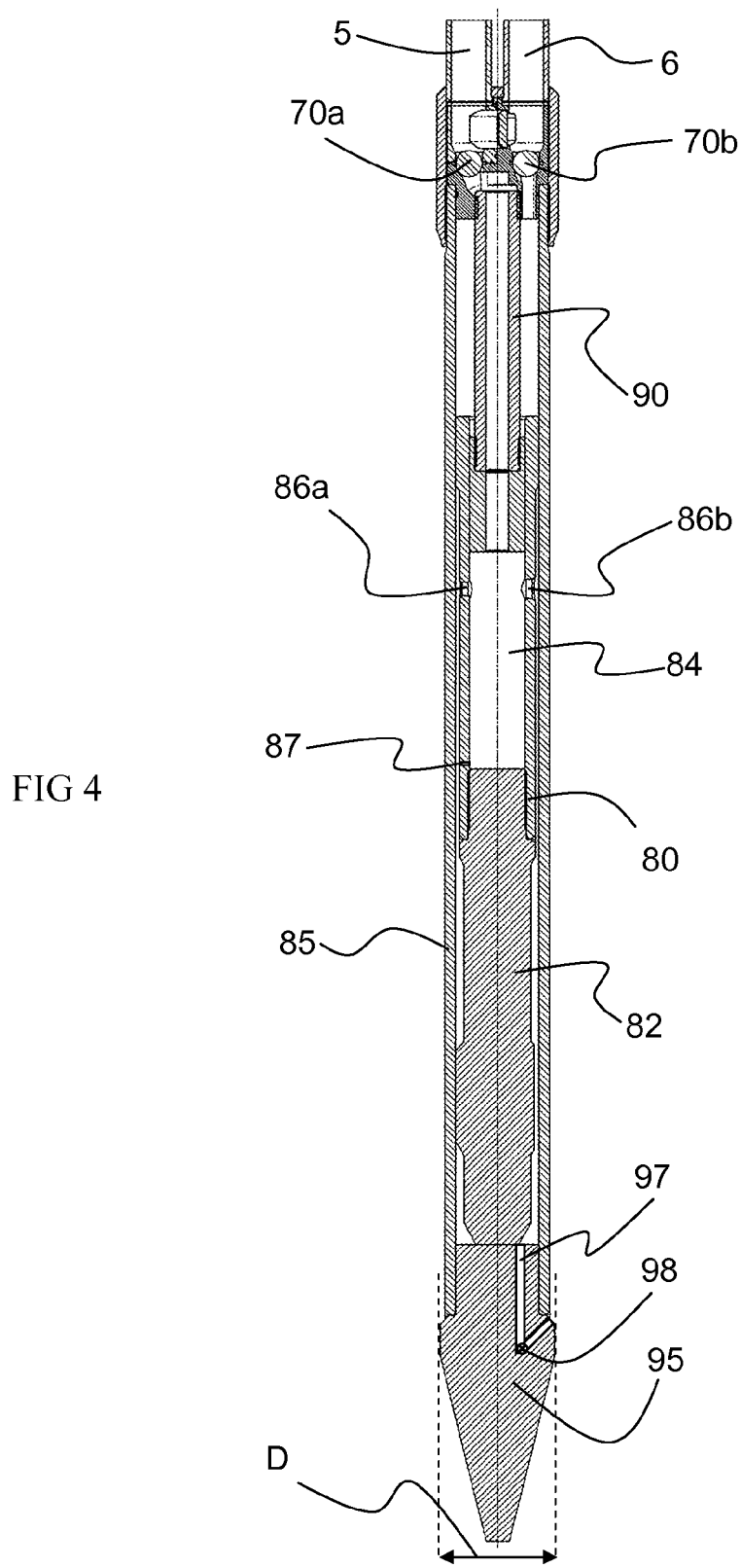
FIG. 4 shows a cross-section of the moling machine, illustrating its drive mechanism.

FIG. 4 illustrates the relationship between the ports at the rear of the mole and the drive mechanism. The drive mechanism comprises a piston 80 which has a forward part 82 and a rearward part 84. The forward part 82 is a solid mass, which provides the momentum to drive the mole. The rearward part 84 is hollow chamber. The piston 80 is seated inside the casing 85 of the mole, and can slide longitudinally inside it. The chamber 84 receives compressed air from the pipe 5 via the first passage 10 and a stem 90 which extends into the chamber 84 from the rear. Starting with the piston positioned at the rear of the mole, the force of the compressed air will drive the piston forward until openings 86a, 86b in the wall of the chamber are exposed. This allows the air to vent into a space between the piston and the casing. At this point, the mass 82 strikes the inside of the nose 95 of the mole. The pressure of the compressed air on the outside of the piston then tends to push the piston backwards. The holes 86 will be closed again as the walls of the chamber 84 slide backwards over the end of the stem 90. However, the momentum of the piston carries it back further, until the holes are exposed again around the narrow part of the stem 90. This allows the air to be exhausted via the second passage 20 and pipe 6. In this regard, the drive mechanism of the pneumatic mole of this embodiment is conventional. It may be beneficial, however, to fabricate the stem 90 wholly or partially from plastics material, rather than using the conventional metal construction. A plastic stem will offer greater flexibility and resilience as the piston slides forward and back again. The inventor has found that the manufacturing tolerances on the piston 80 and inside of the casing 85 can be relaxed as a result of this flexibility, which in turn can make the mole cheaper to manufacture.

A variety of suitable plastic materials can be used. In this embodiment, High-Density Polyethylene (HDPE) is used and the stem is fabricated integrally with the valve part. The integrated part can be manufactured, for example, by injection moulding.

The plastic stem can be beneficial independently of the other features described. Accordingly a further independent inventive concept is disclosed, which provides: a percussion mole comprising a casing 85; a drive mechanism inside the casing; and an input passage 10 for delivering a driving fluid to the drive mechanism, wherein the drive mechanism comprises a piston 80 slidable within the casing and having a chamber 84; and a stem 90 for communicating the driving fluid from the input passage 10 to the chamber 84, so as to drive the piston, the stem being formed wholly or partially of a plastics material. The stem is preferably fixed relative to the casing. That is, the stem is preferably not a moving part of the drive mechanism. The interior of the chamber 84 may have a uniform cross section in the longitudinal direction (the direction in which the piston is slidable) and the stem may comprise: a first part having an external cross section matching the interior of the chamber; and a second part having a smaller cross section. The second part is preferably made of plastic. The first part may be made of metal. The plastic part can flex resiliently as the piston slides backwards and forwards, thereby permitting a certain amount of play. This means that the piston can move slightly transverse to the (longitudinal) direction of sliding, without causing wear or damaging stress to the stem or other parts of the mole. Consequently, the moving parts (and the adjacent fixed parts) no longer need to be manufactured to such a high degree of precision. Forming the first part from metal may help to avoid rapid wear on the end of the stem.

As the mole is driven into the ground, it pulls the pipes 5, 6 behind it. The surrounding soil exerts a frictional force on the trailing pipes, which opposes the driving force of the mole. The degree of friction will depend on the type of soil into which the ground-loop is being inserted. However, the effect is to make the insertion more difficult. In the worst case, the pipes 5, 6 may be stretched, detached from the mole, or otherwise damaged.

In the present embodiment, the effects of friction are reduced by grouting the pipes with a dry granular material as they are inserted. This material is made of grains of recycled glass. The grains reduce the friction between the pipes and the soil. Once the installation is complete, the material acts as a grout or caulk, filling any space around the pipes, and ensuring good thermal conductivity to the soil. During the insertion process, the grains can be poured at the entrance to the hole created by the mole (that is, the point of insertion of the pipes into the ground). Here, they are naturally drawn into the hole as the pipes slide into the ground.

In the present example, the granular material is graded sodium silicate glass sand made from container glass cullet. The glass grains have sizes in the range of 1-2 mm. That is, substantially all the grains will pass through a sieve having 2 mm apertures, while fewer than 5% of the grains will pass through a sieve having 1 mm apertures. Typical thermal conductivity for these glass granules is in the range 1.3-1.5 watts per meter Kelvin (W/m K).

More generally, the inventor has also discovered that if a mole is used to bore a vertical hole, it can be beneficial to provide a portion at the front of the mole of slightly greater diameter than the remainder of the body. For example, the mole may include a head or nose cone 95, which flares to a greater width than that of parts of the mole to the rear of the nose cone. This reduces the effect of friction over the length of the mole, because the bore of the hole created by the nose is wider than most of the body of the mole. Note that this is only appropriate for vertical (or steep angle) insertion of a mole, where gravity plays a significant role. In horizontal or shallow-angle moling, the friction between the casing and the surrounding earth is actually desirable, because it ensures that the mole does not slip backwards in the bore as the piston is driven backward in the exhaust cycle. Note that having a head wider than the remainder of the body might ordinarily make the mole difficult to withdraw (in the reverse direction)—particularly if the soil forming the wall of the bore collapses around it. However, this is not a problem in the present application, because it is always intended to leave the mole in place in the ground, as part of the geothermal ground loop.

Accordingly an additional independent inventive concept is disclosed, which provides: a percussion mole comprising a head 95 for displacing soil and a body 85, wherein the head 95 includes a portion that is wider than the body. The body is to the rear of the head and is preferably longer than the head. The head should present a wider profile in at least one longitudinal cross-section through the mole. Here, "longitudinal" refers to a plane parallel to the direction of travel of the mole. Preferably, the head has a wider profile than the body in every longitudinal cross-section. Preferably, the largest cross-section of the head in the transverse plane (that is, looking along the length of the mole, in the direction of travel) is larger than the cross-section of the body. This means that the head creates a hole larger than the size necessary to allow passage of the body of the mole, thereby reducing friction on the body. Preferably, the body has a uniform cross section. Preferably, the head has a cross section of the same shape as the body. The body and head may be circular in cross-section, in which case the largest diameter D of the head would be greater than the diameter of the body. A circular cross section is optimal in one sense, because it minimises the surface area of the mole. Thus, the body may be cylindrical and the head may be conical or a stepped conical shape. However, other cross-sectional shapes may be used.

In the present embodiment, the body 85 is cylindrical, with a diameter of 75 mm and the head 95 is substantially conical, with a widest diameter at the base of the cone of 80 mm. Thus, the head may be in the range 105% to 110% of the width of the body, more preferably approximately 107% of the width of the body. The valve part at the rear of the body 85 is 95 mm in width and 115 mm long. The combined length of the head, body, and valve part is 1055 mm. The head accounts form 160 mm of this length.

In practice, the compressed air used to drive the mole is likely to contain water in liquid and/or vapour form. Diesel compressors, in particular, will produce compressed air with a significant amount of water vapour. It has been found that water can interfere with the operation of the mole, during insertion. As the mole drills into the ground, the water vapour can condense, due to cooling of the compressed air. Any liquid in the pipes 5, 6 will tend to drain downwards and collect in the drive mechanism of the mole. If sufficient liquid collects, this will impede the moving parts of the drive mechanism. To address this problem, the present inventors have introduced a bleed-valve mechanism in the mole.

There are two principle points at which liquid contaminants, such as water, tend to collect in the mole. The first is at the bottom of the hollow piston-chamber 84. To address this, a hole 87 of small aperture (for example, 2 mm) is provided in the wall of the chamber, at or near the lower end of the chamber 84, to allow this liquid to drain out of the piston into the inside of the casing 85. The hole 87 is located below the main openings 86a, 86b for exhausting the compressed air, and has a much smaller size (for example, 2% to 10% of the dimensions of the openings 86a, b). Although there will be a leakage of compressed air through the hole 87 when there is no liquid present to drain, the small size of the hole compared with the sizes of the compressed air openings 86a, b means that the volume of air escaping will have a negligible effect on the operation of the drive mechanism.

The second point of water accumulation is at the bottom end of the inside of the casing 85. Liquid will collect here as it drains from the hole 87 in the wall of the piston-chamber 84. Also, water vapour which condenses in the exhaust pipe 6 may flow back down into the mole and collect here. This liquid is expelled to the surrounding soil, through a bleed passage 97, extending from the bottom of the inside of the casing 85, through the head 95 of the mole. A non-return valve 98 in the bleed passage 97 allows the liquid to be expelled, under the force of compressed air, while preventing ingress of ground-water, for example, when the compressed air supply is switched off and disconnected.

Figure 5:
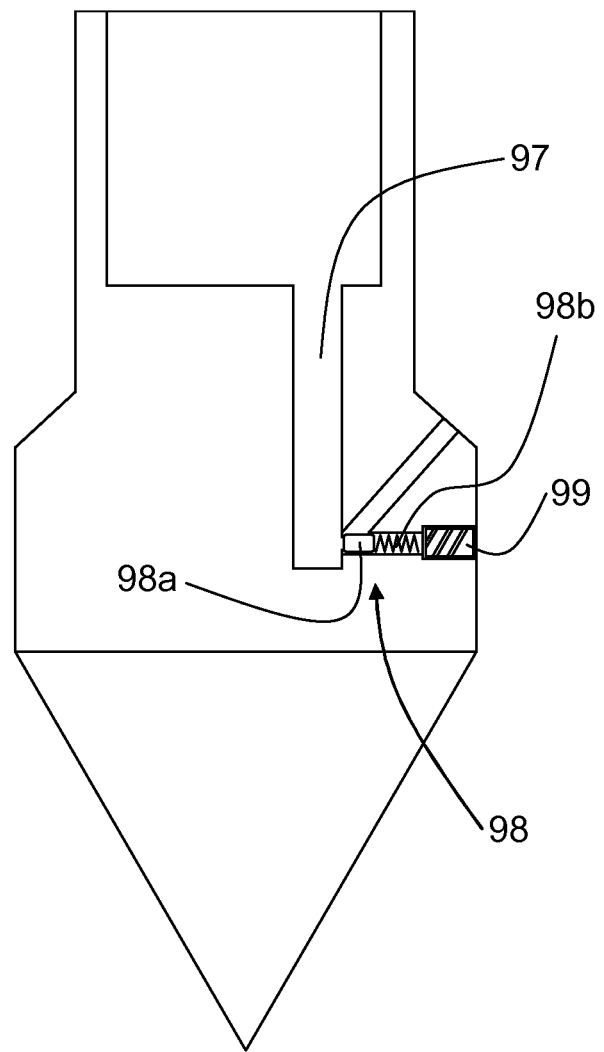
FIG. 5 shows a bleed mechanism of the moling machine of FIG. 4 in greater detail.

The bleed passage of the present embodiment is shown in greater detail in FIG. 5. The passage has a minimum dimension similar to that of the hole 87—2 mm in this embodiment. The non-return valve 98 comprises a plunger 98a biased toward a closed configuration of the valve by a captive spring 98b. The spring 98b is held in position by a grub screw 99, which is accessible from the outside of the mole. This facilitates easy manufacture of the bleed mechanism. When the mole is being driven by compressed air, the pressure difference will open the valve, by forcing the plunger 98a backwards to compress the captive spring 98b. The pressure difference will then expel out of the mole any liquid that has flowed to the bottom of the inside of the casing 84. As already mentioned above, there will be a small, but constant, leakage of air as long as there is no liquid to expel. However, this is negligible because of the small aperture of the passageway relative to the volume of air flowing through the mole.

It is noted that these problems caused by condensation and pooling of water are linked to the nature of the task: the water tends to collect inside the mole because the mole is typically being driven vertically downwards or downward at an oblique angle. If the mole was instead being driven horizontally (as is the case for many traditional uses of moling), the pooling of liquid would not occur. In other words, this problem is specific to applications in which a mole is inserted at a downward angle. Likewise the solution of the bleed mechanism will be applicable to any task requiring moling at such an angle. It is also noted that the bleed mechanism takes advantage of gravity to solve the problem—by allowing collected liquid to escape from the bottom end of the respective cavity in which it lies.

A second embodiment of the invention will now be described, which is very similar to the first. In this embodiment, the one-way valve 40 has the additional feature that it locks in the open position. That is, once the valve is opened for the first time by positive fluid pressure at the second passage, it remains permanently open. In this sense, the valve is a one-way valve only during the insertion of the mole.

The non-return valve 40 is initially provided in its closed configuration (like FIG. 2). The use of this mole begins identically to the mole of the first embodiment described above: compressed air is supplied to the first passage, which drives the mole and tends to keep the non-return valve 40 closed. Once insertion is finished and the mole is at the desired depth, the balls 70a, 70b are injected to isolate the ground-loop from the front parts of the mole 4. The supply of compressed air to the second passage 20, to inject the second ball 70b, opens the non-return valve 40. The valve of the second embodiment incorporates latching means, such that the flap is now retained in the open position. This means that heat-exchange fluid can be circulated through the ground-loop in either direction, when the heat-pump system is in use. This embodiment may avoid the potential for mistakes in the installation procedure, particularly if one person inserts the ground loop and another person later connects the pipes 5, 6 to the heat pump system. With the arrangement of the first embodiment, the person connecting the pipes should know which pipe is which, otherwise the heat-exchange fluid source may be inadvertently connected to the first pipe 5, in which case the non-return valve would prevent circulation.

In other embodiments, one or both of the balls 70a, 70b may be omitted, so that the ground-loop is only partially isolated from the front of the mole, or is not isolated at all. If only one ball is used (for example 70b), there will be no flow of heat-exchange fluid through the drive mechanism of the mole; however, the mechanism may fill with heat-exchange fluid, through the non-isolated passage 10. If no isolation at all is provided, some of the heat-exchange fluid may circulate through the drive mechanism of the mole 4. However, the majority of the flow will still be through the open connection 30, because this will be the path of least resistance. In either case (partial or no isolation) the forward parts of the mole should be hermetically sealed, since otherwise heat-exchange fluid could leak out into the surrounding soil (or ground-water pressure could force ground-water in, contaminating or diluting the heat-exchange fluid.

In the embodiments described above, the stem 90 (which delivers compressed air to the chamber 84 in the piston) is fabricated wholly or partially from a plastics material and the other major components are fabricated from metal. However, other embodiments have also been developed in which the stem 90 is made of metal. In these embodiments, friction between the inside surface of the chamber 84 and the outer surface of the stem 90, as the piston slides back and forth, may interfere with efficient and effective operation of the mole. One way of reducing this friction is to use one or more self-lubricating seals between the stem 90 and the piston chamber 84. For example, nylon self-lubricating seals are available which may be suitable.

More generally, it may also be desirable to reduce friction between the the interior of the casing 85 and the outside of the piston 80 sliding within the casing 85. Self-lubricating seals can also be used for this purpose.

Alternatively, it may be preferred to treat the surfaces of the metal components to reduce the coefficient of friction. In one embodiment the outer surface of the stem 90 and the interior of the chamber 84 are treated with a nitrocarburising plus oxidation process, such as one of the Nitrotec® family of treatments. The interior of the casing 85 and outer surfaces of the piston 80 may also be treated with a similar process.

Use of techniques such as this to reduce friction inside the mole may avoid the need to provide a liquid lubricant to lubricate the internal moving parts of the mole. In embodiments without friction reducing measures, it may be desirable to use a mist (aerosol) lubricant. However, this may have the disadvantage that lubricant drains towards the head of the mole where it then accumulates and can interfere with correct operation. The effect is the same as water accumulating at the bottom of the mole, already discussed above. As discussed above, in embodiments which suffer from problems of liquid accumulation, it may be necessary to take additional measures to allow drainage (such as the hole 87 in the wall of the chamber 84, and the bleed-passage 97 through the head 95 of the mole). Therefore, the use of suitable friction reducing measures, such as Nitrotec® treatments may avoid the need to provide drainage (for example, if the compressed air used to drive the mole is sufficiently dry to avoid condensation and accumulation of water). Thus, in an embodiment in which the outer surface of the stem 90; the interior of the chamber 84; the interior of the casing 85; and the outer surfaces of the piston 80 are treated with the Nitrotec® treatment, the vent hole 87 and vent passage 97 may be eliminated.

Various other modifications will be apparent to those skilled in the art. For example, the mole may be hydraulically powered instead of pneumatically powered. If the mole is powered by hydraulic fluid, it will typically be necessary to take additional measures to provide the reciprocating action that drives the mole. Hydraulic fluid, unlike the air in a pneumatic system, is not compressible. In the pneumatic system, the compression of the air provides a degree of resilience that helps to returns the piston to its starting position. If the mole is to be hydraulically powered, this resilience could be provided instead by an enclosed volume of compressible gas, or by a spring inside the casing.

If the percussion mole is pneumatically powered, references to compressed "air" should be taken to include any gas or mixture of gases, as those skilled in the art will implicitly understand.

In the embodiments described above, dry granular material is used to lubricate the insertion of the pipes and to grout them. Alternatively, a liquid can be used for this purpose. It may be beneficial under certain circumstances to use a drilling fluid or drilling mud. For example, liquid drilling fluid polymers comprising anionic acrylamide co-polymer dispersed in a light mineral oil are known in the art of drilling. It may be especially beneficial to use such products if the angle at which the pipes are being inserted is shallow, because the use of dry granular material depends to some extent on the force of gravity, and this force is lessened at shallow angles. The liquid drilling fluid polymer can be added to water or to a bentonite system.

There will be many different suitable mechanisms for providing the non-return mechanism in the valve 40. Nevertheless, the flap 40 of the embodiments described may have benefits of simplicity and reliability. As with the other components of the mole which are active only during insertion, longevity is not necessarily a requirement. The drive mechanism of mole is only used once and is redundant once the ground-loop is in use in the heat-pump system. Likewise, the non-return valve should prevent leakage of driving fluid through the connection 30 during insertion of the mole; but after insertion, the main requirement is that it does not block the circulation of heat-exchange fluid. It does not, for example, need to re-form a seal to block the connection again. This recognition can lead to simpler and lighter components, and cheaper manufacture of the moling apparatus.

As described above, constrictions 50, 52 in the passages 10, 20 may be provided by a rubber O-ring in the wall of the bore. Alternatively or in addition, they may be provided by a narrowing of the bore of each passage at a point beyond the connection 30 between them.

If the balls 70a, 70b are made of a relatively hard plastics material, such as HDPE, a rubber O-ring may be desirable, in order to obtain the necessary resilience to produce a reliable seal. However, if the balls are made of a relatively soft elastomeric material, such as a natural or synthetic rubber, they will be intrinsically deformable and resilient. In this case, the O-ring may be unnecessary and the constriction may instead be provided by narrowing of the bore itself.

Insertion of the balls 70a, 70b using the force of the compressed air is one advantageous example from a variety of mechanisms suitable for switching the valve from a first to a second, isolated configuration. For example, the switching could be achieved by other mechanisms and triggered electrically; by a thermal fuse or motor; or by means of a control cable or cord; or even a separate hydraulic connection.

Preferably, however the driving fluid used to drive the mole is also used to actuate the opening of the non-return valve and/or the switching of the device to the second, isolated configuration, because this can lead to a simplified procedure for installing the ground loop.

Although geothermal heat-pump systems of the type described are most commonly used to extract heat from a body of earth or water and to heat buildings, they can of course be used in other applications. For example, they could be used to heat (or pre-heat) water for domestic use or for a swimming pool. Similarly, they can be used to transport heat between two bodies of earth: for example from soil deeper underground to soil near the surface. This can be useful to protect playing fields against frost, among other purposes. As those skilled in the art will appreciate, the present invention is equally applicable to all these applications.

The invention claimed is:

1. A percussion mole for inserting a ground-loop for a geothermal heat-pump apparatus, the ground-loop including a first pipe and a second pipe, the mole comprising:
    a percussive drive mechanism;
    a first passage, for receiving a driving fluid via the first pipe and delivering it to the drive mechanism, during insertion of the ground-loop;
    a second passage, for exhausting the driving fluid from the drive mechanism via the second pipe, during insertion of the ground-loop; and
    a connection between the first passage and the second passage, the connection including a non-return valve arranged to restrict flow of the driving fluid from the first passage to the second passage during insertion of the ground-loop but permit flow in the opposite direction, whereby, after insertion, when the heat pump apparatus is in use, the ground-loop comprises the first and second pipes; the first and second passages; and the connection.

2. A percussion mole according to claim 1, wherein the mole has:
a first configuration in which each of the first and second passages is in fluid communication with the percussive drive mechanism; and
a second configuration in which at least one of the first and second passages is isolated from the drive mechanism.

3. A percussion mole according to claim 2, wherein both of the first and second passages are isolated from the drive mechanism in the second configuration.

4. A percussion mole according to claim 2, wherein the mole is adapted to switch from the first configuration to the second configuration in response to the receipt of a body injected into at least one of the first passage and the second passage.

5. A percussion mole according to claim 4, wherein at least one of the first passage and the second passage comprises a constriction adapted to receive the body, thereby isolating that passage from the drive mechanism.

6. A percussion mole according to claim 1, wherein the non-return valve comprises a flap mounted in the connection on a pivot offset from the centre of the connection,
the flap being rotatable about the pivot to block the connection in response to positive fluid pressure at the first passage and
rotatable to unblock the connection in response to positive fluid pressure at the second passage.

7. A percussion mole according to claim 1, wherein the non-return valve has a first configuration in which it prevents fluid-flow from the first passage to the second passage; and a second configuration in which it allows fluid-flow from the second passage to the first passage.

8. A percussion mole according to claim 7, wherein the non-return valve is initially in the first configuration and is adapted to lock in the second configuration.

9. A percussion mole according to claim 1, comprising:
a head and a body,
wherein the head includes a portion that is wider than the body, in at least one longitudinal cross-section.

10. A percussion mole according to claim 1, further comprising a casing around the drive mechanism, and
wherein the drive mechanism comprises:
a piston slidable within the casing and having a chamber; and
a stem, for communicating the driving fluid from the first passage to the chamber, so as to drive the piston, the stem being formed wholly or partially of a plastics material.

11. A kit of parts comprising:
a mole according to claim 4; and
at least one body for injection into at least one of the first passage and the second passage of the mole.

12. A method of inserting and using a ground-loop for a geothermal heat-pump system, the ground-loop including a first pipe and a second pipe, using a percussion mole according to claim 1, the method comprising:
supplying driving fluid to the first passage of the mole via the first pipe so as to drive the mole into the ground; and
after the mole has been driven a desired distance, supplying heat-exchange fluid to the second passage via the second pipe,
whereby the heat-exchange fluid flows in through the second pipe; into the second passage; through the connection; out of the first passage; and out through the first pipe.

13. A method of inserting and using a ground-loop for a geothermal heat-pump system, the ground-loop including a first pipe and a second pipe, using a percussion mole according to claim 8, the method comprising:
supplying driving fluid to the first passage of the mole via the first pipe so as to drive the mole into the ground;
after the mole has been driven a desired distance, switching the non-return valve irreversibly to the second configuration by supplying a fluid to the second passage via the second pipe; followed by
circulating heat-exchange fluid through the first pipe; first passage; connection; second passage; and second pipe, in either direction.

14. A method of inserting a ground-loop for a geothermal heat-pump system, the ground-loop including a first pipe and a second pipe, using a percussion mole according to claim 4, the method comprising:
supplying driving fluid to the first passage of the mole via the first pipe so as to drive the mole into the ground; and
after the mole has been driven a desired distance, injecting a body into at least one of the first passage and the second passage, to switch the mole to the second configuration.

15. A method according to claim 14, wherein the step of switching the mole to the second configuration comprises:
injecting a first body into the first passage under the force of driving fluid; followed by,
injecting a second body into the second passage under the force of driving fluid.

* * * * *